US012544905B2

(12) United States Patent
Fischer et al.

(10) Patent No.: US 12,544,905 B2
(45) Date of Patent: Feb. 10, 2026

(54) TOOL ACCESSORY HOLDER, TOOL SYSTEM, AND TOOL ACCESSORY STORAGE SYSTEM

(71) Applicant: MILWAUKEE ELECTRIC TOOL CORPORATION, Brookfield, WI (US)

(72) Inventors: Evan H. Fischer, Milwaukee, WI (US); Zach M. McMahon, Wauwatosa, WI (US); Brad Urban, Wauwatosa, WI (US); Yi He Zeng, Ji'an (CN)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/580,705

(22) PCT Filed: Jul. 19, 2022

(86) PCT No.: PCT/US2022/037623
§ 371 (c)(1),
(2) Date: Jan. 19, 2024

(87) PCT Pub. No.: WO2023/003900
PCT Pub. Date: Jan. 26, 2023

(65) Prior Publication Data

US 2025/0083298 A1 Mar. 13, 2025

(30) Foreign Application Priority Data

Jul. 22, 2021 (CN) ......................... 202121680283.0

(51) Int. Cl.
*B25H 3/00* (2006.01)
*B25H 3/02* (2006.01)

(52) U.S. Cl.
CPC ............. *B25H 3/003* (2013.01); *B25H 3/021* (2013.01)

(58) Field of Classification Search
CPC .......... B25H 3/00; B25H 3/021; B25H 3/006; B25H 3/023; B25H 5/00; B25H 3/003; B65D 25/107
USPC ............ 206/379, 273, 372; 211/69; 220/629
See application file for complete search history.

(56) References Cited

U.S. PATENT DOCUMENTS

| | | | |
|---|---|---|---|
| 33,253 | A | 9/1861 | Lewis |
| 337,888 | A | 3/1886 | Swan |
| 858,393 | A | 7/1907 | Horner |
| 2,228,493 | A | 1/1941 | Will |

(Continued)

FOREIGN PATENT DOCUMENTS

EP 1344609 A1 9/2003

OTHER PUBLICATIONS

International Search Report and Written Opinion for Application No. PCT/US2022/037623 dated Nov. 2, 2022 (10 pages).

*Primary Examiner* — Steven A. Reynolds
*Assistant Examiner* — Prince Pal
(74) *Attorney, Agent, or Firm* — Michael Best & Friedrich LLP

(57) ABSTRACT

A tool accessory holder for use with a tool accessory case and configured to couple to a power tool, a tool system, and tool accessory storage system. The tool accessory holder can be removed from the tool accessory case and coupled to the power tool and removed from the power tool and coupled to the tool accessory case. The tool system includes an accessory holder and a power tool. The tool accessory holder is alternately couplable to the tool accessory storage case and to the power tool.

12 Claims, 6 Drawing Sheets

(56) References Cited

U.S. PATENT DOCUMENTS 2,228,921 A 1/1941 Frederick
2,287,425 A 6/1942 Fox
2,370,928 A 3/1945 Baldanza
2,508,951 A 5/1950 Kazimier
2,687,157 A 8/1954 Cowan
2,800,220 A 7/1957 Hawver
3,003,618 A * 10/1961 Lebedzinski ............ B25H 3/02 206/373
3,061,136 A 10/1962 Sterngart
D194,339 S 1/1963 Harty, Jr. et al.
3,360,644 A 12/1967 Lillebostad
3,583,556 A 6/1971 Wagner
4,150,746 A * 4/1979 Buglione ................. B25H 3/02 312/902
4,191,291 A 3/1980 Brown
4,211,337 A 7/1980 Weavers et al.
4,469,225 A 9/1984 Takahashi
4,573,575 A 3/1986 Bergrath et al.
4,598,822 A 7/1986 Hemmings
4,619,364 A 10/1986 Czopor, Jr.
4,660,719 A 4/1987 Peterson et al.
4,807,760 A 2/1989 Sussman
4,955,478 A 9/1990 Rau et al.
5,006,066 A 4/1991 Rouse
5,056,661 A 10/1991 Balzano
5,098,235 A * 3/1992 Svetlik ................... B25H 3/003 408/234
5,108,287 A 4/1992 Yee et al.
5,190,154 A * 3/1993 Reusch .................. B25H 3/003 206/375
5,312,250 A 5/1994 Ellman et al.
5,368,164 A * 11/1994 Bennett .................... B25H 3/06 206/379
5,429,235 A 7/1995 Chen
5,437,502 A * 8/1995 Warnick ................... B25H 3/04 312/249.11
5,464,091 A * 11/1995 Callahan ............ G11B 33/0438
5,472,110 A 12/1995 Boyd et al.
D367,759 S 3/1996 Jacobson
5,497,875 A 3/1996 Kuo
5,520,400 A 5/1996 Hung
5,526,929 A 6/1996 Wei
5,562,208 A 10/1996 Hasler et al.
5,570,784 A 11/1996 Sidabras et al.
5,641,066 A 6/1997 Mascaro
5,676,254 A 10/1997 Cheng et al.
5,680,932 A * 10/1997 Dickinson .............. B25H 3/023 220/523
5,758,769 A 6/1998 Vasudeva
5,758,770 A 6/1998 Moneta
5,762,411 A * 6/1998 Yemini .................... B25H 3/06 292/210
5,813,532 A * 9/1998 Kheradpir .............. B25H 3/003 220/377
5,823,332 A * 10/1998 Clausen ............. G11B 33/0433 211/41.12
5,839,579 A 11/1998 Lee
D403,508 S 1/1999 Kheradpir et al.
D403,566 S 1/1999 Marsh
D406,057 S 2/1999 Hager
5,882,097 A * 3/1999 Kohagen ................ B25H 3/023 206/372
5,887,715 A 3/1999 Vasudeva
5,957,285 A 9/1999 Lai
D418,977 S 1/2000 Streich
6,032,796 A 3/2000 Hopper et al.
6,050,409 A 4/2000 Delbeck et al.
6,068,123 A 5/2000 Chen
D426,705 S 6/2000 Fang
6,070,732 A 6/2000 Chen
D427,435 S 7/2000 Gibson et al.
D428,699 S 8/2000 Gibson et al.
6,105,767 A 8/2000 Vasudeva
6,105,769 A 8/2000 Chen
D431,359 S 10/2000 Lapidus
D432,304 S 10/2000 Zurwelle et al.
D432,790 S 10/2000 Streich et al.
D433,627 S 11/2000 Vasudeva
D436,441 S 1/2001 Lapidus
D437,684 S 2/2001 Streich et al.
D439,408 S 3/2001 Gibson et al.
6,213,296 B1 * 4/2001 Streich ................... B25H 3/003 206/480
6,237,767 B1 5/2001 Lee
D446,018 S 8/2001 Streich et al.
D447,634 S 9/2001 Snider
D448,167 S 9/2001 Pangerc et al.
6,283,291 B1 9/2001 Vasudeva et al.
6,322,177 B1 11/2001 Vasudeva
6,405,864 B1 * 6/2002 Streich ................... B25H 3/003 206/443
6,415,922 B1 7/2002 Lee
D466,295 S 12/2002 Snider
6,516,639 B1 2/2003 Margetts et al.
6,547,074 B1 4/2003 Chen
6,571,966 B1 * 6/2003 Hsiao .................... A47F 7/0028 206/379
D477,464 S 7/2003 Cang
D477,714 S 7/2003 Cunningham et al.
D477,912 S 8/2003 Cunningham et al.
D478,209 S 8/2003 Chen
D478,725 S 8/2003 Vasudeva et al.
6,615,983 B1 * 9/2003 Yu .......................... B25H 3/003 206/378
6,626,295 B1 9/2003 Vasudeva
D481,868 S 11/2003 Cunningham et al.
D484,309 S 12/2003 Lee
6,679,381 B1 1/2004 Bush
6,698,608 B2 3/2004 Parker et al.
6,698,609 B2 3/2004 Pangerc et al.
6,755,302 B1 * 6/2004 Streich ................... B25H 3/023 206/379
6,779,681 B2 8/2004 Doerfler et al.
D502,316 S 3/2005 Chen
6,863,175 B2 3/2005 Gelardi
6,868,967 B2 3/2005 Lam
6,880,698 B2 4/2005 Fiore, Jr. et al.
6,905,020 B2 6/2005 Chang
6,913,149 B2 7/2005 Gelardi et al.
6,942,095 B2 9/2005 Chen
6,953,114 B2 * 10/2005 Wang ..................... B25H 3/003 206/375
6,964,545 B1 * 11/2005 Languasco .............. B25F 5/029 362/120
RE38,905 E 12/2005 Wei
6,978,890 B2 12/2005 Pangerc et al.
6,988,616 B2 1/2006 Chen
6,991,103 B2 * 1/2006 Chen ...................... B25H 3/003 206/379
6,994,214 B2 2/2006 Yang
7,032,750 B2 4/2006 Amtenbrink
7,159,712 B1 1/2007 Chen
7,225,923 B2 * 6/2007 Hallee .................... B25H 3/003 206/379
7,249,676 B2 7/2007 Wang
7,264,118 B2 * 9/2007 Chen ........................ B25H 3/00 206/372
7,316,309 B2 1/2008 Streich et al.
7,322,470 B2 * 1/2008 Brunson ................ B25H 3/021 206/378
7,331,455 B2 2/2008 Lin
D563,669 S 3/2008 Bosak et al.
7,367,451 B2 * 5/2008 Pendergraph .......... B25H 3/023 206/459.5
D572,479 S 7/2008 Buck et al.
7,401,698 B2 * 7/2008 Dost .................. A45C 13/1084 206/349
7,401,700 B2 7/2008 Dost et al.
7,434,688 B2 * 10/2008 Hu ......................... B25H 3/023 206/379
7,600,640 B2 10/2009 Hallee et al.
7,661,526 B2 2/2010 Lin

(56) References Cited

U.S. PATENT DOCUMENTS

| | | | | |
|---|---|---|---|---|
| 7,677,391 | B2 | 3/2010 | Pistor et al. | |
| 7,775,358 | B1 * | 8/2010 | Huang | B25H 3/021 206/349 |
| 7,780,016 | B1 | 8/2010 | Cornwell et al. | |
| D624,317 | S | 9/2010 | Wenchel et al. | |
| 7,806,264 | B1 | 10/2010 | Lai | |
| 7,900,771 | B1 * | 3/2011 | Meng | B25H 3/06 206/759 |
| 7,931,143 | B1 * | 4/2011 | Lin | B25H 3/021 220/629 |
| D636,996 | S | 5/2011 | Kokawa et al. | |
| 8,069,984 | B2 * | 12/2011 | Larson | B25H 3/023 206/372 |
| 8,083,060 | B1 * | 12/2011 | Liu | B25H 3/003 211/70.6 |
| 8,251,211 | B1 * | 8/2012 | Chen | B25H 3/025 220/811 |
| 8,267,245 | B2 | 9/2012 | Kotula et al. | |
| 8,276,752 | B1 | 10/2012 | Meng | |
| 8,286,792 | B2 | 10/2012 | Serpico et al. | |
| 8,292,069 | B2 | 10/2012 | Silva Rubio et al. | |
| 8,297,464 | B2 | 10/2012 | Grenier et al. | |
| D670,495 | S | 11/2012 | Lorek et al. | |
| 8,336,708 | B2 | 12/2012 | Potterfield et al. | |
| 8,371,444 | B1 * | 2/2013 | Huang | B25H 3/003 206/374 |
| 8,505,729 | B2 | 8/2013 | Sosnovsky et al. | |
| D691,801 | S | 10/2013 | Lin | |
| 8,607,499 | B2 * | 12/2013 | Hoover | A45C 13/02 43/57.1 |
| D702,679 | S | 4/2014 | Li | |
| D709,699 | S | 7/2014 | Hsu | |
| D710,104 | S | 8/2014 | Tivoly | |
| D728,934 | S * | 5/2015 | Brunner | B25H 3/023 D3/905 |
| 9,156,156 | B2 * | 10/2015 | Wang | B25H 3/021 |
| 9,156,157 | B2 * | 10/2015 | Wang | B65D 25/107 |
| 9,254,565 | B1 * | 2/2016 | Wang | B25H 3/02 |
| 9,375,835 | B1 * | 6/2016 | Lin | B25H 3/00 |
| 9,486,912 | B1 * | 11/2016 | Chen | B25H 3/02 |
| 9,656,384 | B1 * | 5/2017 | Tsai | B25H 3/003 |
| 9,744,663 | B2 * | 8/2017 | Lin | B25H 3/02 |
| 10,710,235 | B1 * | 7/2020 | Cantlon | B25H 3/025 |
| 11,077,545 | B2 * | 8/2021 | Christen | B25H 3/003 |
| 11,192,235 | B2 | 12/2021 | Steele et al. | |
| 11,759,942 | B2 * | 9/2023 | Hohl | B25H 3/06 206/379 |
| 12,011,820 | B2 * | 6/2024 | Moss | B25B 21/00 |
| 2002/0153203 | A1 | 10/2002 | Pangerc et al. | |
| 2003/0010733 | A1 * | 1/2003 | Ling | A47F 7/00 211/70.6 |
| 2003/0016993 | A1 * | 1/2003 | Chen | B25H 3/003 403/329 |
| 2003/0075468 | A1 * | 4/2003 | Story | B25H 3/02 206/373 |
| 2003/0106821 | A1 * | 6/2003 | Bar-Erez | B25H 3/003 206/372 |
| 2003/0180105 | A1 * | 9/2003 | Hsiao | B25H 3/003 407/120 |
| 2003/0221984 | A1 * | 12/2003 | Huang | B25H 3/02 206/372 |
| 2003/0226779 | A1 * | 12/2003 | Chen | B25H 3/003 206/45.24 |
| 2004/0069668 | A1 | 4/2004 | Finnigan | |
| 2004/0099554 | A1 | 5/2004 | Pangerc et al. | |
| 2004/0134818 | A1 * | 7/2004 | Cunningham | B25H 3/023 206/373 |
| 2004/0144671 | A1 * | 7/2004 | Hallee | B25H 3/003 206/373 |
| 2004/0154942 | A1 | 8/2004 | Streich et al. | |
| 2004/0168941 | A1 * | 9/2004 | Cho | B25H 3/023 206/349 |
| 2004/0188366 | A1 * | 9/2004 | Tong | B25H 3/003 206/378 |
| 2004/0211691 | A1 * | 10/2004 | Winnard | B25H 3/003 206/378 |
| 2005/0029140 | A1 | 2/2005 | Wang | |
| 2005/0044904 | A1 | 3/2005 | Horngren et al. | |
| 2005/0045509 | A1 | 3/2005 | Chen | |
| 2005/0061694 | A1 | 3/2005 | Ting | |
| 2005/0077198 | A1 * | 4/2005 | Wikle | B25H 3/025 206/373 |
| 2005/0087470 | A1 * | 4/2005 | Chuang | B65D 25/107 206/499 |
| 2005/0126944 | A1 | 6/2005 | Wang | |
| 2005/0150848 | A1 * | 7/2005 | Hun | B25H 3/003 206/379 |
| 2005/0166692 | A1 | 8/2005 | Wang | |
| 2005/0178686 | A1 * | 8/2005 | Pangerc | B25H 3/003 206/379 |
| 2005/0211587 | A1 * | 9/2005 | Chen | B25H 3/003 206/349 |
| 2005/0221664 | A1 * | 10/2005 | Winnard | B25H 3/003 439/510 |
| 2005/0241974 | A1 * | 11/2005 | Chen | B25H 3/003 206/349 |
| 2005/0269340 | A1 | 12/2005 | Chuan | |
| 2006/0011624 | A1 * | 1/2006 | Shih | B25H 3/02 220/4.24 |
| 2006/0065557 | A1 * | 3/2006 | Brunson | B25H 3/003 206/273 |
| 2006/0065658 | A1 | 3/2006 | Brunson | |
| 2006/0070900 | A1 * | 4/2006 | Brunson | B25H 3/003 206/372 |
| 2006/0091032 | A1 * | 5/2006 | Tsai | A45C 13/28 206/373 |
| 2006/0118446 | A1 * | 6/2006 | Liu | B25H 3/003 206/379 |
| 2006/0196793 | A1 * | 9/2006 | Pendergraph | B25H 3/023 206/372 |
| 2006/0201835 | A1 * | 9/2006 | Shih | B25H 3/023 206/373 |
| 2007/0074984 | A1 | 4/2007 | Liu | |
| 2007/0084740 | A1 * | 4/2007 | Malek | A61C 19/02 206/373 |
| 2007/0235360 | A1 * | 10/2007 | Lin | B25H 3/025 206/373 |
| 2007/0257455 | A1 * | 11/2007 | Cho | B25H 3/023 280/47.26 |
| 2007/0262876 | A1 | 11/2007 | Marsilio et al. | |
| 2008/0035508 | A1 | 2/2008 | Streich et al. | |
| 2008/0035510 | A1 | 2/2008 | Brunson | |
| 2008/0060967 | A1 * | 3/2008 | Chang | B25F 5/006 206/521 |
| 2008/0135447 | A1 | 6/2008 | Wang | |
| 2008/0210593 | A1 * | 9/2008 | Cornwell | B25H 3/003 206/234 |
| 2009/0266730 | A1 | 10/2009 | Lin | |
| 2011/0031145 | A1 * | 2/2011 | Larson | B25H 3/003 206/372 |
| 2011/0073516 | A1 | 3/2011 | Zelinskiy | |
| 2011/0084078 | A1 * | 4/2011 | Twig | B25H 3/022 220/507 |
| 2012/0043238 | A1 * | 2/2012 | Christopher | B25H 3/003 206/375 |
| 2012/0248131 | A1 | 10/2012 | Wang | |
| 2012/0267374 | A1 | 10/2012 | Kotula et al. | |
| 2013/0284773 | A1 * | 10/2013 | Meng | B25H 3/003 206/349 |
| 2014/0023475 | A1 * | 1/2014 | Meyers | B25J 1/00 414/800 |
| 2014/0028169 | A1 * | 1/2014 | Lin | B25H 3/021 312/326 |
| 2014/0231307 | A1 * | 8/2014 | Wen | B25H 3/02 206/736 |
| 2014/0332423 | A1 * | 11/2014 | Lee | B25H 3/02 206/349 |

(56) References Cited

U.S. PATENT DOCUMENTS

2014/0374297 A1* 12/2014 Vilkomirski ........... B25H 3/025 206/373
2015/0165617 A1* 6/2015 Chern ...................... B25H 3/02 206/374
2015/0251308 A1* 9/2015 Chao-Ming ............ B25H 3/023 206/349
2015/0258676 A1* 9/2015 Wang ..................... B25H 3/021 206/349
2015/0258677 A1* 9/2015 Wang ................... B65D 25/107 206/349
2015/0352712 A1* 12/2015 Harrison .................. B25H 5/00 206/349
2016/0008972 A1* 1/2016 Chen ........................ B25H 3/02 206/373
2016/0008973 A1* 1/2016 Bensman ............... B65D 43/16 206/372
2016/0052125 A1* 2/2016 Steele .................. B65D 25/205 206/349
2016/0053987 A1* 2/2016 Hsu .......................... B25H 3/02 206/372
2016/0089773 A1* 3/2016 Lin ........................ B65D 25/10 206/372
2016/0107308 A1* 4/2016 Hsu ........................ B25H 3/003 206/349
2016/0167219 A1 6/2016 Cho
2016/0236342 A1* 8/2016 Evatt ...................... B25H 3/003
2016/0290013 A1* 10/2016 Lin ........................ B25H 3/003
2016/0346915 A1* 12/2016 Lin .......................... B25H 3/02
2017/0121056 A1* 5/2017 Wang ................. B65D 21/0228
2017/0257958 A1* 9/2017 Sabbag ................ H05K 5/0204
2017/0282353 A1* 10/2017 Steele .................... B25H 3/021
2017/0334060 A1* 11/2017 Ou ........................... B25H 3/02
2017/0361454 A1* 12/2017 Hsu ........................ B25H 3/003
2018/0142509 A1 5/2018 Brown
2019/0001482 A1* 1/2019 Wolle ....................... B25H 3/02
2019/0039781 A1* 2/2019 Kögel ................ B65D 21/0212
2019/0168376 A1* 6/2019 Brocket ................. B25H 3/021
2019/0210213 A1* 7/2019 Omry ....................... B25H 3/02
2019/0283234 A1* 9/2019 Ko ......................... B25H 3/025
2019/0351540 A1* 11/2019 Lamb ..................... B25H 3/023
2020/0180138 A1* 6/2020 D'Alessandro .......... B25H 3/00
2020/0198119 A1* 6/2020 Miley .................... B25H 3/003
2020/0200340 A1* 6/2020 Pugh, II .................. F21V 23/04
2020/0238501 A1* 7/2020 Baum .................... B25H 3/003
2020/0324399 A1* 10/2020 Christen ................ B25H 3/022
2021/0060761 A1* 3/2021 Chang .................... B25H 3/003
2021/0078159 A1* 3/2021 Jiang .................. B65D 21/0213
2021/0146525 A1* 5/2021 Spaulding, Jr. .......... B25H 3/02
2021/0237253 A1* 8/2021 Moss ...................... B25B 21/00
2021/0245358 A1* 8/2021 Hohl ........................ B25H 3/06
2021/0245360 A1* 8/2021 Hohl ...................... B25H 3/003
2021/0394354 A1* 12/2021 Miley .................... B25H 3/003
2022/0176541 A1* 6/2022 Lai ......................... B25H 3/003
2022/0355462 A1* 11/2022 Cho ....................... B25H 3/021
2023/0092514 A1* 3/2023 Brocket ................. B25H 3/021 206/509
2023/0150109 A1* 5/2023 Chiang .................. B25H 3/006 206/375
2023/0294270 A1* 9/2023 Cho ....................... B25H 3/022 206/373
2023/0364771 A1* 11/2023 Craig ..................... B25H 3/003
2024/0100683 A1* 3/2024 Hong ..................... B25H 3/006
2025/0083298 A1* 3/2025 Fischer .................. B25H 3/003

* cited by examiner

TOOL ACCESSORY HOLDER, TOOL SYSTEM, AND TOOL ACCESSORY STORAGE SYSTEM

CROSS REFERENCE TO RELATED APPLICATIONS

This application is a national stage filing under 35 U.S.C. § 371 of International Application No. PCT/US2022/037623, filed on Jul. 19, 2022, which claims priority to Chinese Application No. 202121680283.0, filed Jul. 22, 2021, the entire contents of each of which are incorporated herein by reference.

TECHNICAL FIELD

The present disclosure relates to tool accessory holders, tool systems, and tool accessory storage systems. The present disclosure also relates to storage devices and, more particularly, to holders for tool bits.

BACKGROUND

Holders for tool accessories or tool bits such as drill bits, impact screwdriver bits, torque bits, and the like are known. Such holders typically include retaining means for holding the tool bits in an organized manner. Conventionally, such holders are retained in storage cases configured to hold multiple tool accessory holders. In some instances, a user may require a variety of different tool bits useable with one or more power tools.

SUMMARY

In first aspect, the disclosure provides a tool accessory holder for use with a tool accessory case and configured to couple to a power tool. The tool accessory holder includes a body configured to hold one or more tool accessories for use with the power tool. The body is selectively received in the tool accessory case. The tool accessory holder further includes a first retainer coupled to the body and configured to couple the tool accessory holder to the tool accessory case, and a second retainer coupled to the body and configured to couple the tool accessory holder to the power tool. The tool accessory holder can be removed from the tool accessory case and coupled to the power tool. The tool accessory holder is removable from the power tool and couplable to the tool accessory case.

In some embodiments of the first aspect, the first retainer is a projection extending from a side of the body.

In some embodiments of the first aspect, the projection is configured to be releasably coupled to an engagement feature located on a sidewall of the tool accessory case.

In some embodiments of the first aspect, the projection is a first projection. The first retainer also includes a second projection extending from a side of the body opposite the first projection.

In some embodiments of the first aspect, the second retainer is a bore formed in the body. The bore receives a threaded fastener to couple the tool accessory holder to the power tool.

In some embodiments of the first aspect, the bore extends through a front and a back of the body.

In some embodiments of the first aspect, the tool accessory holder is rotatable relative to tool accessory case while coupled to the tool accessory case.

In some embodiments of the first aspect, the tool accessory holder is moveable relative the tool accessory case between a storage position and an upright position while coupled to the tool accessory case.

In some embodiments of the first aspect, the body defines a plurality of compartments. Each of the plurality of compartments is configured to receive one of the one or more tool accessories for use with the power tool.

In some embodiments of the first aspect, the plurality of compartments is arranged in a row along a length of the body.

In some embodiments of the first aspect, the one or more tool accessories for use with the power tool include one or more selected from a group consisting of a drill bit, a driver bit, an impact bit, and a socket bit.

In a second aspect, the disclosure provides a tool system that includes a tool accessory storage case, a power tool, and a tool accessory holder configured to hold at least one tool accessory for use with the power tool. The tool accessory storage case includes one or more housing members at least partially defining a storage area, and an engagement feature located on the one or more housing members adjacent the storage area. The power tool includes a housing, a motor positioned in the housing, a drive assembly supported by the housing and coupled to the motor, and an output element coupled to the drive assembly. The tool accessory holder is alternately couplable to the tool accessory storage case and to the power tool.

In some embodiments of the second aspect, the tool accessory holder includes a first retainer couplable with the engagement feature of the tool accessory storage case. The tool accessory holder includes a second retainer couplable with a retainer of the power tool.

In some embodiments of the second aspect, the first retainer is a projection. The second retainer is a bore that receives a threaded fastener.

In some embodiments of the second aspect, the housing of the power tool includes a battery receptacle defining a foot of the power tool. The tool accessory holder couples to the foot.

In some embodiments of the second aspect, the housing also includes a motor housing portion that receives the motor and a handle portion extending from the motor housing portion. The battery receptacle is coupled to an end of the handle portion opposite from the motor housing portion.

In some embodiments of the second aspect, the engagement feature is one of a plurality of engagement features located on the one or more housing members. The tool accessory holder is couplable to the plurality of engagement features in different positions.

In a third aspect, the disclosure provides a tool accessory storage system that includes a tool accessory case including one or more housing members at least partially defining a storage area, and an engagement feature located on the one or more housing members adjacent the storage area. The tool accessory storage system further includes a tool accessory holder including a body configured to hold one or more tool accessories for use with a power tool, and a retainer coupled to the body. The retainer is selectively engageable with the engagement feature to removably couple the tool accessory holder to the tool accessory case. The tool accessory holder is removable from the tool accessory case and configured to couple to the power tool.

In some embodiments of the third aspect, the retainer is a projection extending from a side of the body. The engagement feature is a receiver formed in a sidewall of the one or more housing members.

In some embodiments of the third aspect, the tool accessory holder also includes a bore formed in the body. The bore receives a threaded fastener to couple the tool accessory holder to the power tool.

In a fourth aspect, there is provided a method of alternately coupling a tool accessory holder to a tool accessory case and a power tool. The method includes providing engagement features on the tool accessory case and coupling a retainer to a body of the tool accessory holder. The method further includes removably coupling the engagement features with the retainer to couple the tool accessory holder to the tool accessory case. The method even further includes removably coupling the tool accessory holder to the power tool.

Other aspects of the disclosure will become apparent by consideration of the detailed description and accompanying drawings. Any feature(s) described herein in relation to one aspect or embodiment may be combined with any other feature(s) described herein in relation to any other aspect or embodiment as appropriate and applicable.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
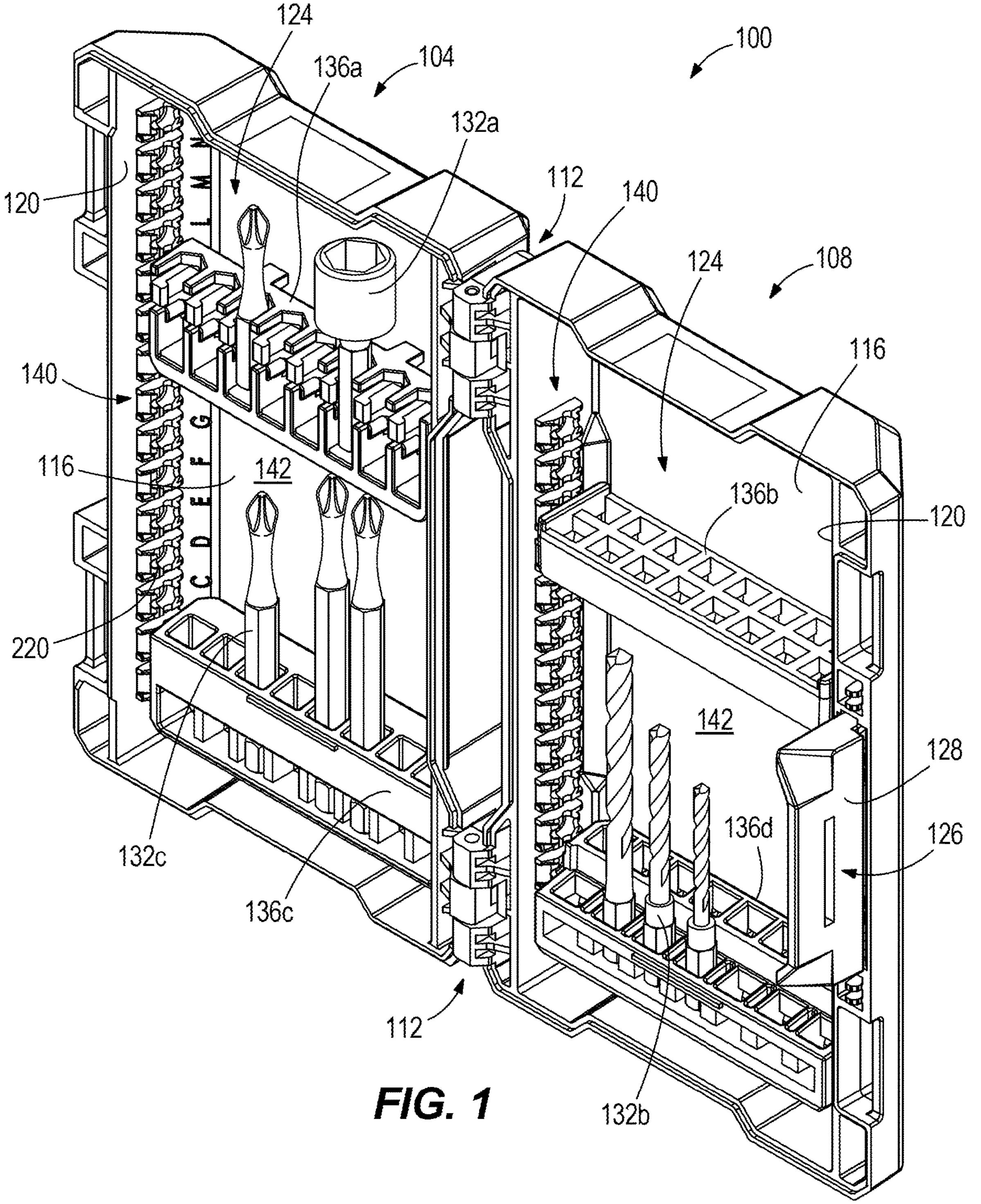
FIG. 1 is a perspective view of a tool accessory case and a plurality of different tool accessory holders supported by the tool accessory case, according to one embodiment of the disclosure.
Figure 5:
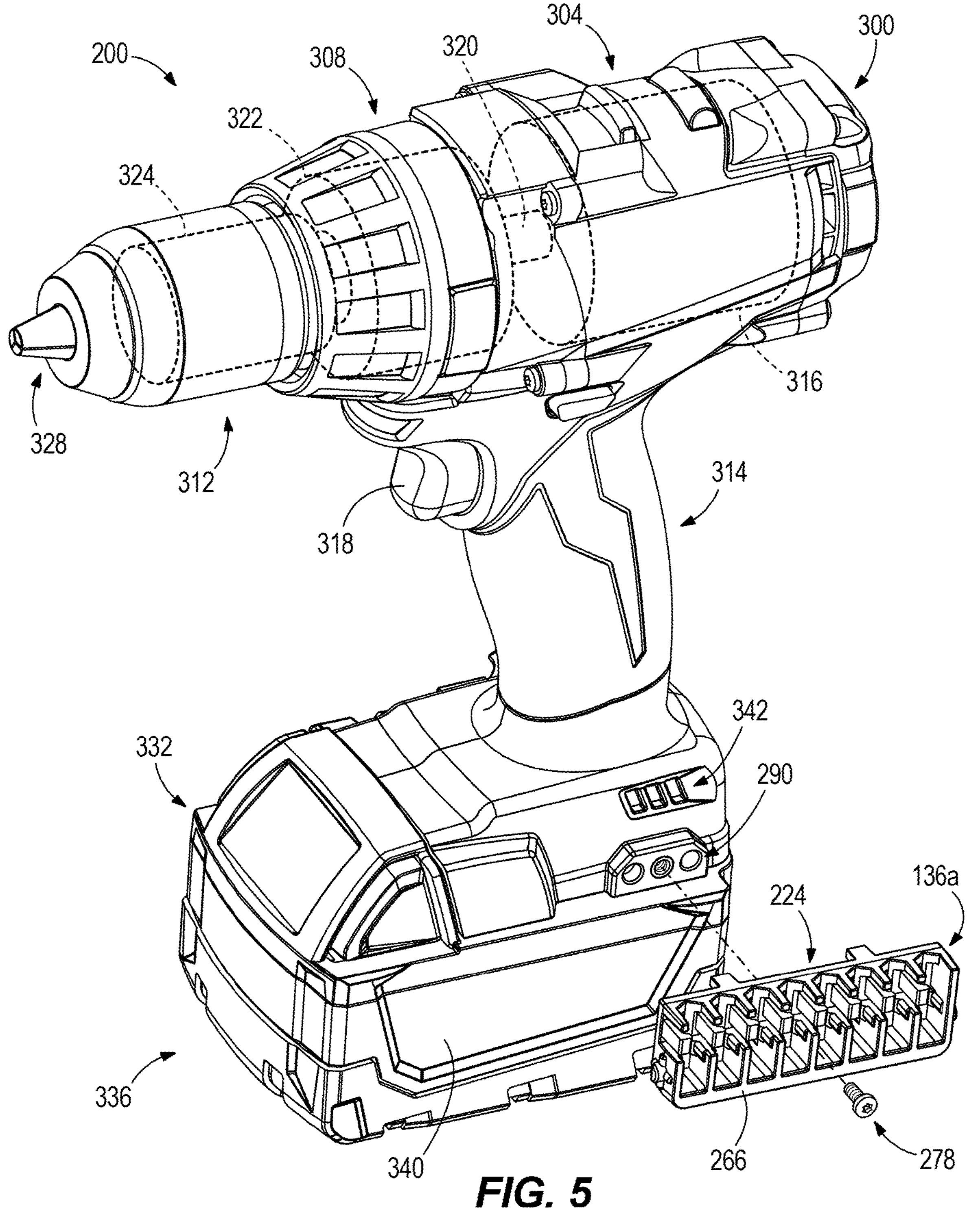
FIG. 5 is a perspective view of a power tool and the tool accessory holder of FIG. 3, illustrating the tool accessory holder separated from the power tool.

FIGS. 1 and 5 together illustrate a tool accessory storage system that includes a tool accessory case 100 (FIG. 1), a power tool 200 (FIG. 5), and a plurality of tool accessory holders 136*a*, 136*b*, 136*c*, 136*d* configured to hold one or more tool accessories 132*a*, 132*b*, 132*c* for use with the power tool 200. The tool accessory holders 136*a-d* can be alternately coupled to the tool accessory case 100 and the power tool 200.

Figure 2:
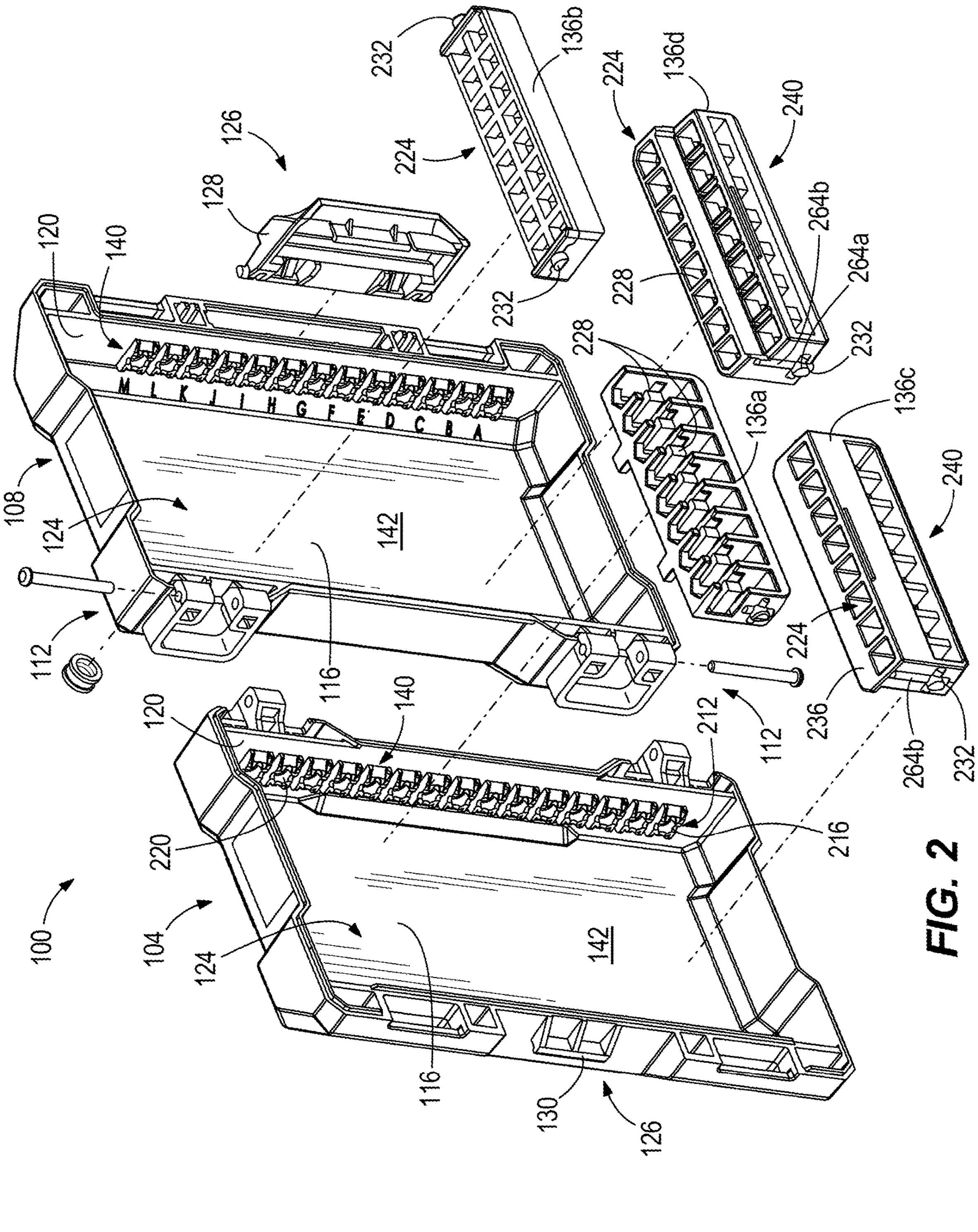
FIG. 2 is an exploded perspective view of the tool accessory case and the plurality of different tool accessory holders of FIG. 1.

FIGS. 1 and 2 illustrate the tool accessory or bit case 100 including two housing members 104, 108 pivotally coupled together by two hinges 112. In the illustrated embodiment, the first housing member 104 is a front cover, and the second housing member 108 is a rear cover. Each of the front cover 104 and the rear cover 108 includes a base 116 and sidewalls 120 that extend from and surround the base 116. In some embodiments, the tool bit case 100 is stackable with other tool bit cases of different sizes (e.g., tool bit cases having larger or smaller footprint areas). In the illustrated embodiment, the tool bit case 100 generally has a dog bone shape.

As illustrated in FIG. 1, the front and rear covers 104, 108 are pivotable between an open position and a closed position (not shown). When in the closed position, the sidewalls 120 of both the front and rear covers 104, 108 abut each other and enclose a storage space 124. In addition, the hinges 112 define support structures that can support the tool bit case 100 on a surface, such as a table, when the tool bit case 100 is in the closed position. When in the open position, as best illustrated in FIG. 1, the sidewalls 120 of both the front and rear covers 104, 108 are moved away from each other to allow access to the storage space 124. In the illustrated embodiment, the storage space 124 is at least partially defined by an interior volume of one or both of the covers 104, 108.

The tool bit case 100 further includes a latch mechanism 126 to selectively secure the tool bit case 100 in the closed position. The illustrated latch mechanism 126 includes a latch 128 that is pivotally coupled to the rear cover 108 and engageable with a locking protrusion 130 located on the front cover 104. In other embodiments, the relative positions of the latch 128 and the protrusion 130 may be reversed. The latch 128 engages the locking protrusion 130 such that the tool bit case 100 is secured in the closed position. In contrast, the latch 128 disengages from the locking protrusion 130 such that the tool bit case 100 can be opened. The latch mechanism 126 further includes resilient portions that bias the latch 128 towards the locking protrusion 130 while in the locked position.

With specific reference to FIG. 1, the tool bit case 100 retains and organizes multiple types of tool accessories 132*a-c* within the storage space 124. For example, the tool bit case 100 retains various sizes of tool accessories 132*a-c* for use with the power tool 200 (FIG. 5) such as drill bits, driver bits, impact bits, socket bits, and the like. The tool bits 132*a-c* are received in tool accessory or bit holders 136*a-d* that are coupled to engagement features 140. In the illustrated embodiment, the tool bit holders 136*a-d* are pivotably (e.g., rotatably) coupled to the engagement features 140.

The engagement features 140 are located within the storage space 124 on the sidewalls 120 of the front and rear covers 104, 108. The tool bit holders 136*a-d* are multi-positionable relative to the covers 104, 108 to obtain different organization configurations (e.g., to support and store different sizes or types of tool bits 132*a-c*). In addition, the illustrated tool bit holders 136*a-d* are snapped into place within the tool bit case 100 so that the holders 136*a-d* can be removed and repositioned to achieve different configurations. As will be described in greater detail below, one or more of the accessory holders 136*a-d* is additionally removably couplable to the power tool 200.

The tool bit holders 136*a-d*, while in a storage position (FIG. 1), lay flat on an interior surface 142 of the base 116 such that the tool bit case 100 can be closed when all of the tool bit holders 136*a-d* are in the storage position. When the tool bit holders 136*a-d* are in an upright position, the tool bit holders 136*a-d* are rotated approximately 90 degrees to extend generally perpendicularly from the interior surface 142 of the base 116 such that the tool bit case 100 cannot be closed when at least one tool accessory holder 136*c-d* is in the upright position.

As best illustrated in FIG. 2, the engagement features 140 are aligned in series on each opposing sidewall 120 of the front and the rear covers 104, 108. In the illustrated embodiment, the engagement features 140 are equally spaced from each other and correspondingly align with another engagement feature 140 on the opposite sidewall 120. In some embodiments, the engagement features are not equally spaced.

Each engagement feature 140 includes a boss 212 that extends from the sidewall 120 toward the opposing sidewall 120. Each boss 212 defines an aperture 216. In the illustrated embodiment, each engagement feature 140 along one of the sidewalls 120 is identified with indicia (e.g., A-M, 1-13, etc.), which aids in aligning the tool bit holders 136*a-d* across the covers 104, 108. In other embodiments, the engagement features 140 may have other configurations. For example, the engagement features 140 may include projections or posts extending from the sidewalls.

As shown in FIG. 2, each boss 212 includes grooves 220 adjacent the aperture 216. The grooves 220 extend radially outward from corresponding apertures 216. In the illustrated embodiment, each boss 212 includes four grooves 220 that are circumferentially spaced at approximately 90-degree increments around the apertures 216. In addition, adjacent grooves 220 of adjacent bosses 212 are linearly aligned. In other embodiments, the bosses 212 may include less or more than four grooves 220, and/or the grooves 220 may be incremented at different angles.

FIG. 2 further illustrates different types of the tool bit holders 136*a-d* that can be alternately coupled to the accessory storage case 100 and to the power tool 200. Each tool bit holder 136*a-d* includes one or more compartments 224. In the illustrated embodiment, each tool bit holder 136*a-d* includes multiple compartments 224. The compartments 224 are able to receive different tool bits 132*a-c*. Each compartment 224 may be discrete from one or more of the other compartments 224. Each compartment also includes a resilient finger 228 that extends from one side of the discrete compartments 224. In the illustrated embodiment of the bit holders 136*a-d*, as shown best in FIG. 3, the fingers 228 are cantilevered tabs. The fingers 228 engage the tool bits 132*a-c* to help secure the tool bits 132*a-c* within the tool bit holders 136*a-d*. In addition, each of the tool bit holders 136*a-d* include a first retainer 232. In the illustrated embodiment, the first retainer 232 is a projection that extends outwardly from a side surface of the tool bit holders 136*a-d*. The illustrated tool bit holders 136*a-d* include two retainer 232 extending outwardly from opposite side surfaces. In some embodiments, each tool bit holder 136*a-d* may only include one retainer 232. The illustrated retainers 232 are generally cylindrical in shape and retain the tool accessory holders 136*a-d* in the tool accessory case 100. In other embodiments, the retainers 232 may have other configurations. For example, the retainers 232 may be apertures that receive projections on the accessory storage case 100.

Figure 3:
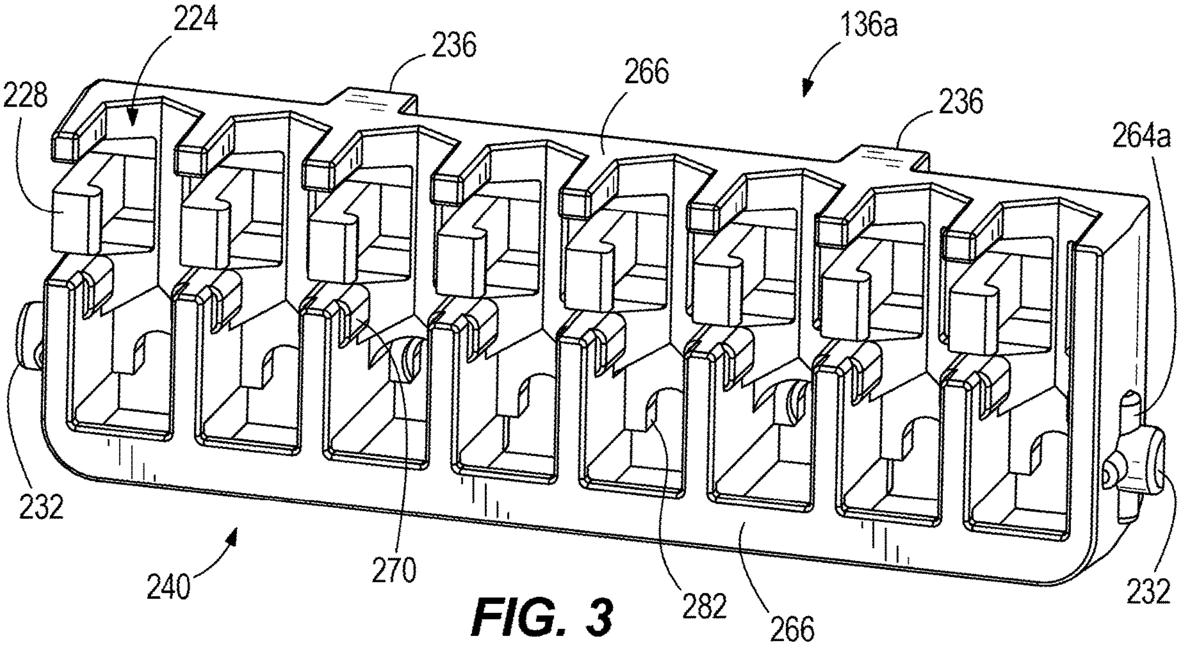
FIG. 3 is a front perspective view of one of the tool accessory holders of FIG. 1.
Figure 4:
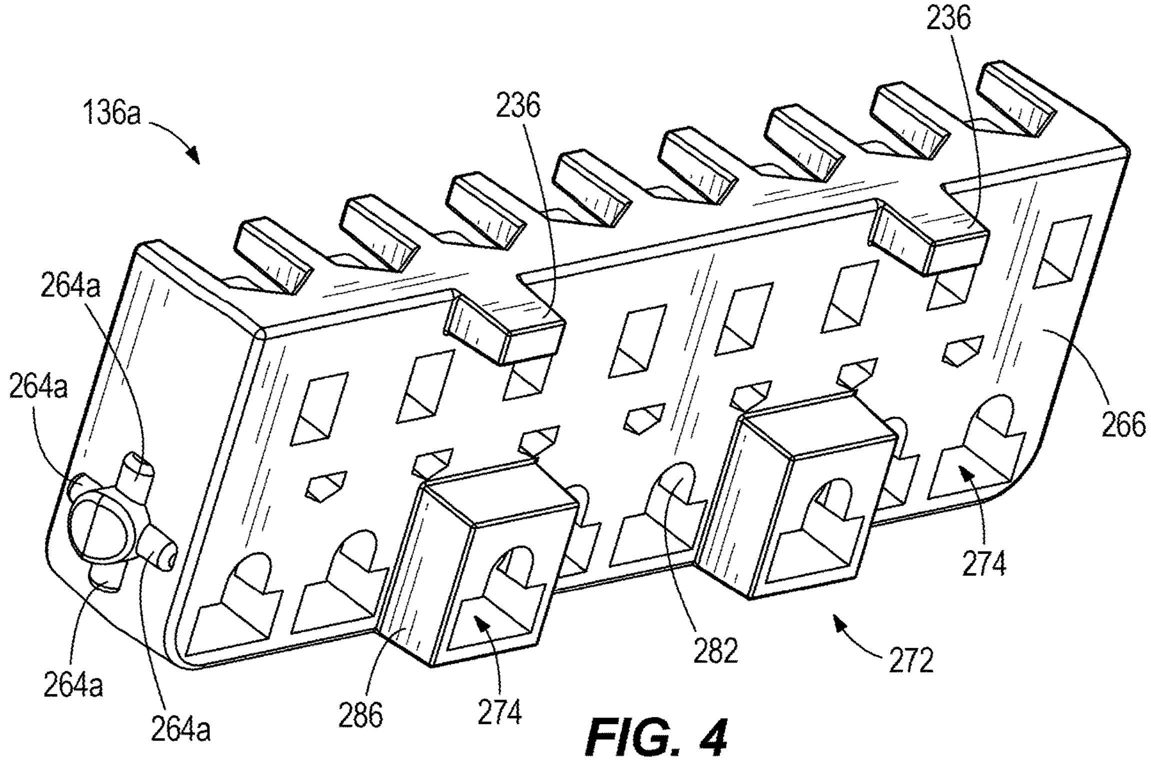
FIG. 4 is a rear perspective view of the tool accessory holder of FIG. 3.

As shown in FIGS. 2-4, particularly in FIG. 3, the tool bit holder 136*a* includes one row of discrete compartments 224. In addition, the tool bit holder 136*a* includes two flanges 236 that inhibit over-pivoting of the tool bit holder 136*a* past the storage position. The tool bit holder 136*a* defines an open region 240 formed in a front face of the holder 136*a*. In the illustrated embodiment, the open region 240 extends completely through the tool bit holder 136*a*.

The tool bit holder 136*a* further includes ribs 264*a* adjacent each projection 232. The ribs 264*a* extend radially outward from the corresponding projection 232. In addition, the ribs 264*a* are configured to fit within the grooves 220 of the engagement features 140. As shown in FIG. 4 of the illustrated embodiment, the tool bit holder 136*a* includes four ribs 264*a* orientated at approximately 90-degrees increments.

Referring specifically to FIG. 2, the tool bit holder 136*b* includes two rows of discrete compartments 224. The resilient fingers (not shown) are located between adjacent discrete compartments 224 of opposing rows. In the illustrated embodiment, the tool bit holder 136*b* does not include ribs. However, in other embodiments, the tool bit holder 136*b* may include ribs 264*a* adjacent the projections 232, similar to the tool bit holder 136*a*.

The tool bit holder 136*c* includes one row of discrete compartments 224. In addition, the tool bit holder 136*c* includes ribs 264*a*, the flange 236, and the open region 240 similar to the tool bit holder 136*a*. In contrast to the tool bit holder 136*a*, the tool bit holder 136*c* includes an elongated rib 264*b* adjacent the projections 232. The elongated rib 264*b* extends at a greater length from the projections 232 than the ribs 264*a*. The illustrated elongated rib 264*b* is configured to span multiple engagement features 140 and engage multiple grooves 220 when the tool bit holder 136*c* is in the storage position. This arrangement helps hold the tool bit holder 136*c* in the storage position. In addition, the tool bit holder 136*c* is taller than the tool bit holder 136*a* to receive longer tool bits 132*a-c*.

The tool bit holder 136*d* includes two rows of discrete compartments 224. The first, or back, row is taller than the second, or front, row such that the first row is able to receive longer tool bits 132*a-c* than the second row. Similar to the tool bit holder 136*c*, the tool bit holder 136*d* includes the open region 240, the ribs 264*a*, and the elongated rib 264*b* adjacent the projections 232. In addition, the second row of discrete compartments 224, which is shorter than the first row, includes the resilient fingers (not shown) at an interface between the first and the second rows. The first row of discrete compartments 224 includes the resilient fingers 228 opposite the interface between the rows.

In operation, the tool bit holders 136*a-d* are pivotally coupled to any pair of engagement features 140 within the covers 104, 108 either in the storage position or the upright position. The projections 232 and ribs 264*a-b* of the tool bit holders 136*a-d* are received in and engage the apertures 216 and grooves 220 of the engagement features 140 to releasably secure the holders 136*a-d* within the case 100 and semi-rigidly retain the tool bit holders 136*a-d* in the storage position or the upright position.

In some instances, the tool bit holders 136*a-d* can receive any combination of tool bits 132*a-c*. When the tool bits 132*a-c* are inserted into the discrete compartments 224, the resilient fingers 228 engage a portion of the tool bits 132*a-c* such that the tool bits 132*a-c* are secured in the tool bit holders 136*a-d* until the user removes (e.g., pulls) the tool bits 132*a-c* from the tool bit holders 136*a-d*. In other words, the resilient fingers 228 provide enough force on the tool bits 132*a-c*, relative to the force of gravity and typical forces during transportation of the tool bit case 100, to retain the tool bits 132*a-c* within the tool bit holders 136*a-d*.

With reference to FIGS. 3 and 4, the tool bit holder 136*a* will be described in more detail. While some of the following features are illustrated and described with respect to the tool bit holder 136*a*, it should be understood that any or all of such features may be incorporated with each of the tool bit holders 136*a-d*. That is, the features/components of the tool bit holder 136*a* described herein are not necessarily exclusive to the tool bit holder 136*a* and are contemplated for each of the tool bit holders 136*a-d*.

As illustrated in FIG. 3, the multiple compartments 224 are formed in a body 266 of the tool bit holder 136*a*. In the illustrated embodiment, the fingers 228 extend from a rear wall of the body 266 and protrude toward the open region 240. The fingers 228 are generally positioned to contact a middle or middle-upper portion of the tool accessories 132*a-c* held in the tool accessory holder 136*a*. The body 266 further includes a stop member or tab 270 generally positioned to extend from the body 266 and contact a lower portion of the tool accessories 132*a-c* than the fingers 228.

Figure 7:
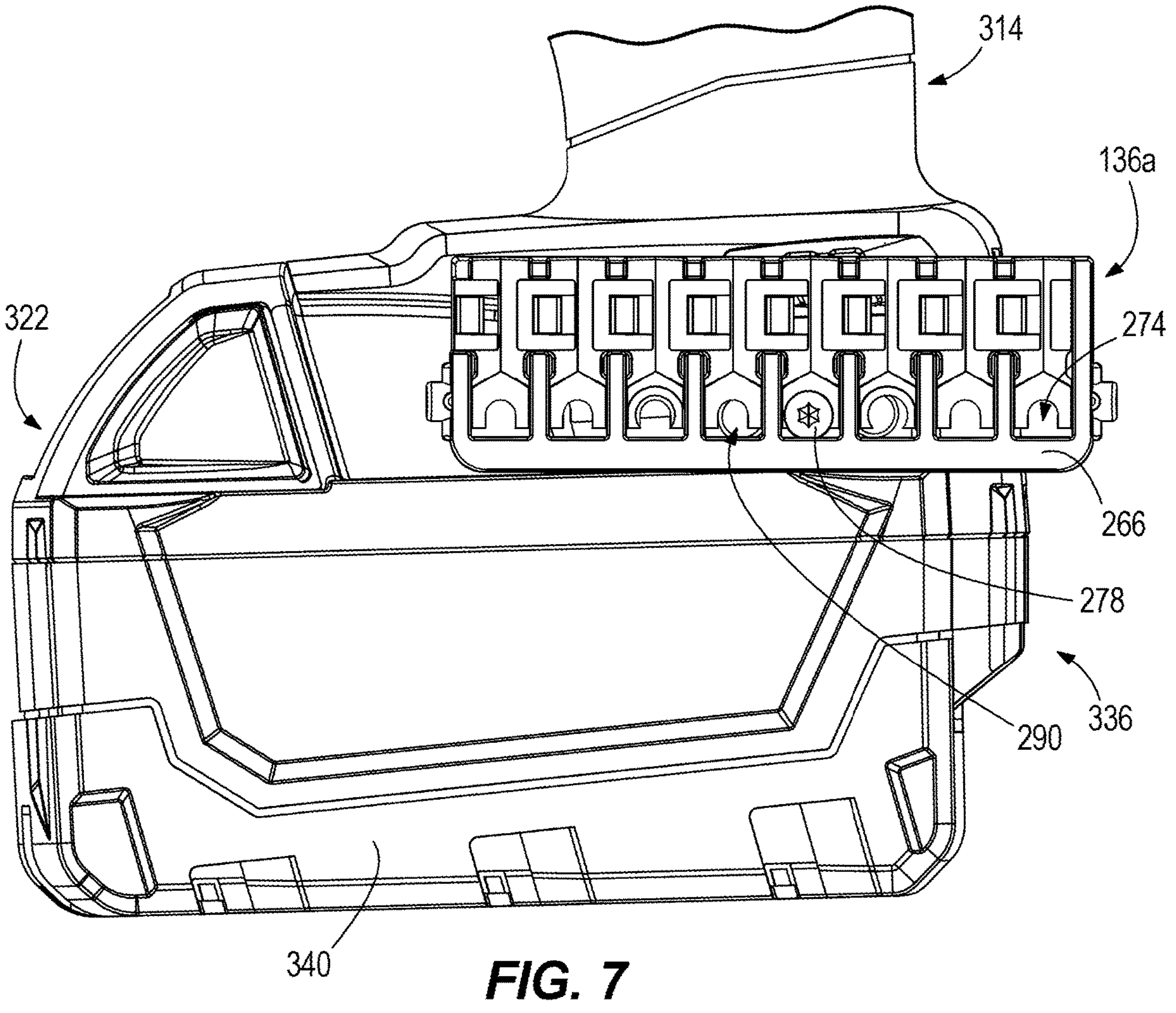
FIG. 7 is an enlarged side view of the foot of the power tool of FIG. 5 and the tool accessory holder of FIG. 3.

Referring now to FIGS. 3 and 4, in addition to the first retainers 232 providing a holder-to-case retainer, the tool bit holder 136*a* further includes a second retainer 272. The second retainer 272 provides a holder-to-power tool retainer. The illustrated second retainer 272 includes a plurality of through holes 274 extending through the body 266. As illustrated in FIGS. 5 and 7, each of the through holes 274 may be sized and shaped to receive a fastener 278. In one example construction of the body 266 and tool bit holder 136*a*, the fastener 278 is a threaded fastener 278 and one or more of the through holes 274 includes a bore 282 configured to receive the threaded fastener 278. The bore 282 is threaded in some embodiments. In the illustrated embodiment, the body 266 includes a boss 286 that protrudes from the body 266 and wraps or extends around at least one of the through holes 274. Providing the boss 286 around the through hole 274 increases an amount of material that receives the fastener 278. The boss 286 is also configured to contact an outer surface of the power tool 200 to help stabilize the tool bit holder 136*a* on the power tool 200. Although the illustrated second retainer 272 includes a plurality of through holes 274, in some embodiments, the second retainer 272 may only include one through hole 274.

Similar to how the first retainer 232 engages the tool bit case 100 to removably couple the tool bit holder 136*a* to the case 100, the second retainer 272 engages the power tool 200 (with the fastener 278) to removably couple the tool bit holder 136*a* to the power tool 200. In other words, the tool bit holder 136*a* includes one retainer (e.g., retainer 232) for coupling to the tool accessory case 100 and another retainer (e.g., retainer 272) for coupling to the power tool 200.

Figure 6:
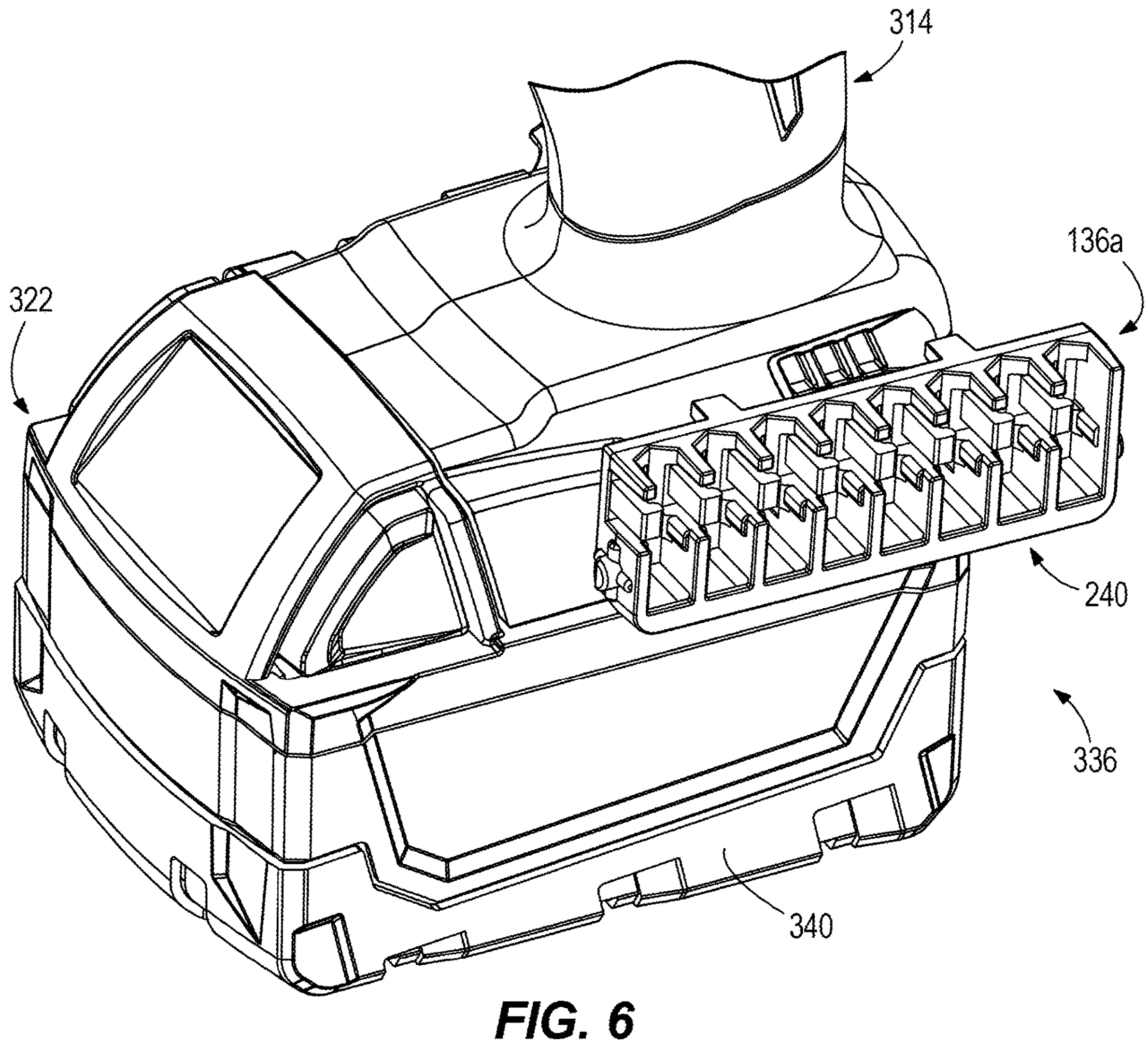
FIG. 6 is an enlarged perspective view of a foot of the power tool of FIG. 5 and the tool accessory holder of FIG. 3 coupled to the power tool.

Referring now to FIGS. 5-7, the power tool 200 includes an engagement feature 290 that receives the fastener 278. As best illustrated in FIG. 5, the power tool 200 includes a housing 300 having a motor housing portion 304, a drive assembly housing portion 308, an output element housing portion 312, and a handle portion 314 graspable by a user. A motor 316 energized by actuation of a trigger 318 is supported in the motor housing portion 304 and includes an output shaft 320. A drive assembly 322 is positioned in the drive assembly housing portion 308 and is configured to be driven by the motor 316 via the output shaft 320. An output element 324 such as a hammer, anvil, camshaft, or the like is supported in the output element housing portion 312 and is driven by drive assembly 322. The output element 324 includes a receiver 328 (e.g., a chuck) that selectively receives the tool accessories 132*a-c*. The handle portion 314 extends from the motor housing portion 304. In the illustrated embodiment, the handle portion 314 extends generally perpendicular to the motor housing portion 304. The power tool 200 further includes a battery receptacle 332 supported by the handle portion 314. The battery receptacle 332 is located at an end of the handle portion 314 opposite from the motor housing portion 304. The battery receptacle 332 is part of a foot 336 of the power tool 200/handle portion 314. The battery receptacle 332 selectively receives a battery pack 340 to power the power tool 200.

The battery pack 340 may be a power tool battery pack 340 generally used to power a power tool, such as an electric drill, a rotary impact tool, a rotary tool, an electric saw, and the like (e.g., an 18 volt rechargeable battery pack, or an M18/M12 REDLITHIUM battery pack sold by Milwaukee Electric Tool Corporation). The battery pack 340 may include lithium ion (Li-ion) cells or packs of a different chemistry (e.g., nickel-cadmium (NiCa or NiCad), nickel-hydride, and the like). The battery pack 340 or power tool 200 may further include an indicator 342 to display the current state of charge of the battery pack and/or other characteristics of the battery pack.

In the illustrated embodiment, the fastener 278 is threadably received in the engagement feature 290 with at least a portion of the tool bit holder 136*a* positioned between a head of the fastener 278 and the power tool 200. In the illustrated embodiment, the engagement feature 290 is a receiver, such as a threaded bore, that receives the fastener 278. In other embodiments, the engagement feature 290 may have other configurations. For example, the engagement feature 290 may include a projection, post, or threaded stud that is received in an aperture of the tool bit holder 136*a*. In some embodiments, one or more fasteners may extend from the body 266 without being received in the through hole 274. For example, a hook or tab may extend from the body 266. In other embodiments, the fastener is rigidly attached to the body 266 such that the entire tool bit holder 136*a* may be rotated to thread the fastener into the receiver 290 of the power tool 200. In the illustrated embodiment, the receiver 290 is positioned adjacent the foot 336 of the power tool 200 but could be positioned elsewhere, such as forwardly on the battery receptacle 332, on the battery pack 340, or on another part of the housing 300.

In yet another embodiment, the fastener of the holder-to-power tool retainer includes a magnet, and the receiver 290 of the power tool 200 includes an oppositely polarized magnet. In still another embodiment, the receiver of the power tool 200 includes one or more recessed regions that receive the boss 286, the flange 236, and/or an entire outer periphery of the tool bit holder 136*a*. In an even further embodiment, the power tool 200 includes a retainer arrangement similar to the engagement features 140 of the tool bit case 100 such that the projections 232 and ribs 264*a* of tool bit holder 136*a* engage a complimentary retainer structure on the power tool 200. In such further embodiments, the holder-to-power tool retainer and the holder-to-case retainer are one in the same.

In operation of the tool bit holder 136*a*, the tool bit holder 136*a* can be selectively removed from the tool accessory case 100 and, as shown in FIGS. 6 and 7, coupled to the power tool 200, or the tool bit holder 136*a* can be removed from the power tool 200 and selectively coupled to the tool accessory case 100. As illustrated in FIG. 7, the threaded fastener 278 is received in a central or generally middle through hole 274 on the tool bit holder 136*a* and fastened to the receiver 290 of the power tool 200, which, in some embodiments, includes a threaded bore. It should be understood that any of the through holes 274 may accommodate the fastener 278 such that the tool bit holder 136*a* is attachable to the power tool 200 in a more forwardly or rearwardly position depending on a user's desire or preference.

Although the disclosure has been described in detail with reference to certain preferred embodiments, variations and modifications exist within the scope and spirit of one or more independent aspects of the disclosure as described.

Various features and advantages of the disclosure are set forth in the claims.

What is claimed is:

1. A tool accessory holder for use with a tool accessory case and configured to couple to a power tool, the tool accessory holder comprising:

a body configured to hold one or more tool accessories for use with the power tool, the body configured to be selectively received in the tool accessory case;

a first retainer coupled to the body and configured to couple the tool accessory holder to the tool accessory case; and a second retainer coupled to the body and configured to couple the tool accessory holder to the power tool;

wherein the tool accessory holder is removable from the tool accessory case and couplable to the power tool, and wherein the body defines a plurality of compartment, wherein each of the plurality of compartments is configured to receive one of the one or more tool accessories for use with the power tool, wherein the plurality of compartments are configured to receive the one of the one or more tool accessories on a front of the body, wherein the body includes a back of the body on a side opposite of the front of the body, wherein the back of the body includes a boss, wherein the second retainer includes a bore formed in the body, the bore extending from the front of the body to the back of the body, and wherein the bore extends within the boss.

2. The tool accessory holder of claim 1, wherein the first retainer is a projection extending from a side of the body.

3. The tool accessory holder of claim 2, wherein the projection is configured to be releasably coupled to an engagement feature located on a sidewall of the tool accessory case.

4. The tool accessory holder of claim 2, wherein the projection is a first projection, and wherein the first retainer also includes a second projection extending from a side of the body opposite the first projection.

5. The tool accessory holder of claim 1, wherein the bore receives a threaded fastener to couple the tool accessory holder to the power tool.

6. The tool accessory holder of claim 1, wherein the tool accessory holder is rotatable relative to tool accessory case while coupled to the tool accessory case.

7. The tool accessory holder of claim 1, wherein the tool accessory holder is moveable relative the tool accessory case between a storage position and an upright position while coupled to the tool accessory case.

8. The tool accessory holder of claim 1, wherein the plurality of compartments is arranged in a row along a length of the body.

9. The tool accessory holder of claim 1, wherein the one or more tool accessories for use with the power tool include one or more selected from a group consisting of a drill bit, a driver bit, an impact bit, and a socket bit.

10. The tool accessory holder of claim 1, wherein the bore extends into one of the plurality of compartments.

11. The tool accessory holder of claim 5, wherein the bore is aligned with the one of the plurality of compartments such that the threaded fastener is received through the one of the plurality of compartments to be received within the bore.

12. The tool accessory holder of claim 1, wherein the back of the body includes a flange configured to inhibit over-pivoting of the tool accessory holder, the flange being spaced apart from the boss.

* * * * *